United States Patent Office 2,945,893
Patented July 19, 1960

2,945,893
CONTINUOUS PRODUCTION OF HEXACHLOR-CYCLOPENTADIENE

Adolf Steinhofer and Manfred Minsinger, Ludwigshafen (Rhine), and Herbert Friederich, Worms (Rhine), Germany, assignors to Badische Anilin- & Soda-Fabrik Aktiengesellschaft, Ludwigshafen (Rhine), Germany
No Drawing. Filed Nov. 7, 1958, Ser. No. 772,415
Claims priority, application Germany Nov. 26, 1957
17 Claims. (Cl. 260—648)

This invention relates to an improved process for the production of hexachlorcyclopentadiene from aliphatic hydrocarbons by reaction with chlorine. In particular it relates to a process for the production of hexachlorcyclopentadiene in the gas phase with the use of new catalysts which are gaseous or which exist in the gas phase under the reaction conditions.

It is already known that hexachlorcyclopentadiene is obtained when aliphatic hydrocarbons with 5 carbon atoms or five-membered cycloaliphatic hydrocarbons are heated with at least the calculated amount of chlorine without or in the presence of solid catalysts to temperatures of about 350° to 550° C. Polychlor compounds of the said hydrocarbons have also already been converted into hexachlorcyclopentadiene by heating, preferably in the presence of chlorine. These methods have the disadvantage that without a catalyst only unsatisfactory yields of the perchlorinated cyclopentadiene are obtained besides considerable amounts of by-products. When working with the use of solid catalyst, for example barium sulfate (cf. German patent specification No. 959,093) it is true that better yields, and in some cases quite good yields, of hexachlorcyclopentadiene are obtained, but the solid catalysts have the disadvantage that by reason of the deposits precipitated thereon they stick and become catalytically inactive so that replacement of catalyst becomes necessary.

In order to obviate this disadvantage attempts have therefore already been made to carry out the reaction in several stages by reacting pentane with chloride in the presence of light to form more or less highly chlorinated pentanes and leading the chlorine compounds, possibly with the addition of further chlorine, at elevated temperature over the solid catalysts. A more recent process consists in leading polychlorpentane with chlorine through a reaction zone at least partly charged with catalyst, of which the temperature continually rises from about 280° to 350° C. to about 375° to 550° C. from the inlet side of the reaction materials to the outlet side thereof, the undesirable reaction products being returned to the reaction zone. Apart from the fact that in the reaction which proceeds with evolution of heat, the maintenance of the temperature gradient offers difficulty and requires special precautions, the disadvantages which attend working with solid catalysts by reason of the deposits precipitated thereon, namely the subsidence of the activity and hindrance to the free passage of the reaction components, are not entirely obviated.

Furthermore it is known to prepare hexachlorcyclopentadiene by chlorination of cyclopentadiene with an alkali hypochlorite solution (cf. Berichte der Deutschen Chemischen Gesellschaft, vol. 63 (1930), page 1884, and U.S. patent specification No. 2,658,085). The separation of the desired hexachlorcyclopentadiene from the chlorination mixture obtained when working in this way is however attended by considerable waste and offers great difficulties because in the distillation, even at a high reflux ratio and when working under reduced pressure, the partially chlorinated cyclopentadienes formed as by-products can only be separated with difficulty from the hexachlorcyclopentadiene. This process therefore has little appeal for carrying out in practice and on a technical scale.

The object of the present invention is to provide a new improved process for the production of hexachlorcyclopentadiene according to which hexachlorcyclopentadiene is obtained in a simple manner easily carried out industrially and the said disadvantages of the prior proposals are avoided.

It is an object of this invention to provide a continuous process for the production of hexachlorcyclopentadiene which is suitable for carrying out on a large technical scale. A further object is to provide new catalysts for the production of hexachlorcyclopentadiene from aliphatic open-chain and cycloaliphatic hydrocarbons with five carbon atoms and chlorine which makes it possible to carry out the reaction in the simplest possible apparatus with high throughputs and good space-time yields, as well as total yields, of hexachlorcyclopentadiene. Yet a further object is to provide new catalyst which show a strongly selective and high activity for the formation of hexachlorcyclopentadiene in the said reaction, cannot give rise to operational and reaction disturbances in the reaction zone and can be readily separated from the reaction mixture obtained.

We have now found that the above mentioned objects are achieved and further advantages which will appear hereinafter may be realised and that hexachlorcyclopentadiene can be obtained in high space-time yields and total yields when at least one aliphatic hydrocarbon from the group consisting of alkanes with 5 carbon atoms of which at least 4 carbon atoms are arranged in a straight chain, cyclopentane, cyclopentene, cyclopentadiene and dicyclopentadiene is led in vapor phase with gaseous chlorine continuously through a reaction zone heated to at least 200° C., preferably about 300° to 500° C., at the same time at least one inorganic or organic nitrogenous compound gaseous under the reaction conditions from the group consisting of oxides of nitrogen, nitrogen oxychlorides, amines of the aliphatic, alicyclic, aromatic and heterocyclic series, benzonitrile, monocarboxylic acid nitriles, unsubstituted monocarboxylic acid amides of alkane- and alkene carboxylic acids with up to 6 carbon atoms and amides of the said kind substituted once or twice by N-alkyl with 1 to 4 carbon atoms, and cyclic N-unsubstituted and N-methyl-to-butyl substituted carboxylic acid amides in which the amido group forms a ring with 3 to 5 $CH_2$ groups, is led in, so that the reaction components and the vaporous catalyst flow through the zone together, the vapors leaving the zone are condensed and the hexachlorcyclopentadiene is separated from the condensate.

Of the inorganic nitrogen compounds described as catalysts there may be mentioned especially dinitrogen oxide ($N_2O$), also known under the names laughing gas and nitrous oxide, nitrogen monoxide (NO) often known briefly as nitrogen oxide or nitric oxide, and nitrogen dioxide ($NO_2$). As nitrogen oxychlorides there may be mentioned nitrosyl chloride (NOCl) and nitryl chloride ($NO_2Cl$). Of the reaction-promoting organic substances there may be mentioned among the amines of the aliphatic, alicyclic and aromatic series above all the primary, secondary and tertiary alkylamines and cycloalkylamines as well as aniline, N-alkylanilines and N.N-dialkylanilines and mixed alkyl-cycloalkylamines. It is preferable to choose for the alkylamines alkyl radicals with 1 to 8 carbon atoms, those with 1 to 4 carbon atoms being preferred. As cycloalkylamines there come into question those with up to 6 carbon atoms, preferably those with 5 or 6 carbon atoms in the ring, and if desired the cycloalkyl groups may have on the ring one or two methyl to butyl groups. Amines which we prefer are for example methylamine, dimethylamine, trimethylamine, ethylamine, diethylamine, triethylamine, propylamine, normalbutylamine, dibutylamine, ethylbutylamine, octylamine and 2-ethylhexylamine, and also cyclohexylamine, cyclopentylamine, N.N-dimethyl-cyclohexylamine, N.N-diethyl-, -dipropyl- and -dibutyl-cyclohexylamine, N-methyl-N-butylcyclohexylamine and N.N-dimethyl-2- or -4-methyl - cyclohexylamine, aniline, N - methylaniline, N.N-dimethylaniline and N-butylaniline.

Of the heterocyclic amines there may be mentioned as specially suitable those in which one N-atom or one NH-group forms with 4 to 6 carbon atoms a saturated or unsaturated ring. The rings may also contain alkyl substituents, for example methyl, ethyl, propyl or butyl groups, on the ring carbon atoms or on the nitrogen atom so far as it contains a replaceable hydrogen atom. As heterocyclic amines there therefore come into question both secondary and tertiary amines. There may be mentioned for example pyridine, picoline, pyrrolidine, piperidine, hexamethylene imine and N-methylpyrrolidine. Heterocyclic amines which contain an oxygen atom combined in the heterocyclic ring as well as the N-hetero atom, for example morpholine, may also be used.

The monocarboxylic acid nitriles of alkane- and alkene carboxylic acids with up to 8 carbon atoms may be unbranched, i.e. straight-chained, or branched. Mononitriles of saturated and unsaturated aliphatic carboxylic acids which have 1 to 4 carbon atoms in the alkyl or alkenyl radicals are especially suitable. There may be mentioned for example acetonitrile, propionitrile, butyronitrile, valeronitrile, caprylic nitrile and oenanthic nitrile as well as of the unsaturated nitriles above all, acrylonitrile and methacrylonitrile. Mononitriles of aromatic carboxylic acids, for example of benzoic acid, may also be used.

As acid amides there may serve according to this invention open-chain and cyclic combined monoamides in which the group

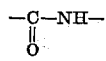

is a component of the ring. Both in the open-chained and ring-combined amides, the hydrogen combined with the N atom of the amide group may be substituted, for example by alkyl groups with 1 to 4 carbon atoms. Of the open-chain amides, it is preferable to use those which are derived from alkane- or alkene carboxylic acids with up to 6 carbon atoms in the alkyl or alkenyl radicals. It is immaterial whether the alkyl- or alkenyl radical to which the amide group is combined is arranged in a straight chain or branched. Open-chain acid amides are for example formamide, acetamide, N-methylformamide, N-ethylacetamide, N.N-dimethylformamide, N.N-dibutylformamide, N-butylacetamide, propionamide, butyramide, iso-butyramide, caproic acid amide and oenanthic acid amide as well as their N-mono- and N.N-disubstituted methyl, ethyl, propyl and butyl derivatives. Of the cyclic amides with ring-combined amide groups those are the most important and best suitable in which the ring is formed from a —CONH- group or —CONR-group (R being methyl to butyl) and 3 to 5 —CH₂ groups, i.e. methylene groups. As representative of the preferred cyclic amides there may be mentioned pyrrolidone, N-methylpyrrolidone, N-butylpyrrolidone, N-propylpyrrolidone and N-ethylpyrrolidone.

The amounts in which the catalysts are co-employed in the reaction can vary within wide limits. Although even by the addition of less than 0.1% by weight with reference to the amount of initial hydrocarbon used, a clear reaction-promoting action occurs, it is preferable to add the catalysts in amounts of 0.2% or more, for example up to about 10% by weight. It is especially advantageous to work with about 1 to 5% by weight. When the co-employed catalysts are not already gaseous at room temperature, they may be brought in the stated amounts in liquid or solid form into the reaction zone where they then immediately become vaporous. They may however first be vaporized and then introduced into the reaction zone as such or together with one of the reaction components or with a mixture of the initial hydrocarbon and chlorine.

The reaction takes place in homogeneous vapor phase at temperatures of at least 200° C. In general operation is preferably in a temperature range of about 300° C. to about 500° C., advantageously between about 320° and 420° C. The most favorable reaction temperatures are to a slight extent different for the different initial hydrocarbons and the co-employed catalysts. The most advantageous temperatures may be readily ascertained by preliminary experiment. The reaction may be carried out by leading the vapor of pentane or of mixtures of various initial hydrocarbons through a reaction zone heated to the reaction temperature and at the same time introducing chlorine and the catalyst in vapor form into the zone. It is preferable to mix the vaporous catalyst with the initial hydrocarbon prior to entry into the reaction zone and then to lead the mixture, if desired preheated up to near to the reaction temperature, into the reaction zone together with chlorine. The preheating may take place for example in heat exchange with the reaction product leaving the zone. The amount of chlorine is chosen so that the mol ratio of hydrocarbon:chlorine is about 1:8 to 1:15, advantageously 1:10 to 1:11; larger amounts of chlorine may however be used. Inert vaporous or gaseous diluents, as for example nitrogen, rare gases or hydrogen chloride, may be co-employed in the reaction in amounts of 5 to 50 mols per mol of chlorine.

As the reaction zone there may serve for example a vertical tube of steel, quartz or ceramic material, for example of porcelain or difficultly fusible glass. The tube, which is preferably heated externally, may also be provided in the interior with guide plates or deflecting plates or may be filled with filler bodies. It is advantageous to introduce the incoming materials into the top of the tube and to withdraw the reaction mixture from the bottom of the tube. When using the catalysts according to this invention, there is no precipitation or settlement of undesirable residues in the reaction zone, even upon prolonged continuous operation, so that the reaction zone is completely clean for example even after 6 months.

The working up of the reaction mixture takes place by cooling the vaporous reaction mixture, for example to room temperature. After separation of the substances which have remained gaseous, the condensed portion can readily be further separated into its components by distillation. If desired the substances which have remained gaseous may be led at least in part back into the reaction zone.

The hexachlorcyclopentadiene obtained is a valuable intermediate product for the production of polyesters, softeners and pesticides, for example by reacting the hexachlorcyclopentadiene in a Diels-Alder reaction with dienophilic compounds in a manner known per se.

The following examples will further illustrate this invention but the invention is not restricted to these examples.

*Example 1*

A vertically arranged tube of ceramic material having a diameter of 22 mm. and a length of 2,000 mm. is heated externally to 355° C. by an electrical resistance heating. Through this tube from the top there is led hourly a vaporous mixture of 36 grams of normal pentane to which 3% by weight of triethylamine has been added as catalyst and 80 liters of nitrogen, while 140 liters of chlorine per hour are supplied to the tube at the same time. At the outlet from the tube, the liquid products of the reaction are condensed. About 123 to 128 grams per hour of a liquid reaction product are obtained which consists to the extent of 88 to 91% by weight of hexachlorcyclopentadiene, 3 to 6% of chlorinated aliphatic hydrocarbons, mainly polychlorpentanes, and 8 to 9% of components of higher boiling point partly containing dimeric hexachlorcyclopentadiene.

The chlorinated aliphatic hydrocarbons may be incorporated with fresh vaporous pentane for the reaction.

The following table gives the amounts of vaporous pentane reacted in the above-described way, the percentage by weight of catalyst in vapor form mixed therewith, the amount of chlorine added and the amount of nitrogen mixed therewith as diluent, the reaction temperature and the composition of the liquid product:

reaction zone heated to 300° C. in an amount of 66 grams per hour and at its entry into the zone there are simultaneously incorporated therewith through separate supply pipes 250 grams of gaseous chlorine and 3 grams of nitrogen monoxide per hour. After cooling the vapors leaving the reaction zone to about 25° C., there are obtained per hour on an average about 241 to 246 grams of a liquid reaction mixture. The liquid mixture consists to the extent of about 78% of hexachlorcyclopentadiene, while the remainder consists of about 17% of cyclo-

| Example | hydrocarbon+percent by weight of catalyst | amount added in g./h. | nitrogen in l./h. | chlorine l./h. | reaction temperature °C. | liquefied reaction products g./h. | content of the liquefied reaction product: | | |
|---|---|---|---|---|---|---|---|---|---|
| | | | | | | | hexachlorcyclopentadiene in percent by weight | chlorinated aliphatic hydrocarbons percent by weight | compounds of higher boiling point in percent by weight |
| 2 | n-pentane+2% n-butylamine | 36 | 20 | 140 | 340 | 124-129 | 89-93 | 5-3 | 6-4 |
| 3 | n-pentane+2% pyridine | 36 | | 180 | 355 | 119-125 | 86-90 | 8-6 | 6-3 |
| 4 | n-pentane+0.8% pyrrolidine | 36 | 80 | 140 | 380 | 124-127 | 88-90 | 8-5 | 4-2 |
| 5 | n-pentane+2% propionitrile | 36 | 80 | 160 | 360 | 119-123 | 89-92 | 5-4 | 5-3 |
| 6 | n-pentane+1% acrylonitrile | 36 | 40 | 160 | 355 | 121-126 | 90-92 | 6-5 | 4-2 |
| 7 | n-pentane+3% benzonitrile | 36 | 40 | 160 | 355 | 113-117 | 85-88 | 10-7 | 5-3 |
| 8 | n-pentane+3% N.N-dimethylformamide.[1] | 36 | 80 | 180 | 370 | 120-124 | 90-93 | 4-3 | 5-4 |
| 9 | n-pentane+3% N-methylpyrrolidone.[1] | 36 | 80 | 140 | 370 | 117-123 | 88-92 | 7-3 | 5-3 |

[1] In these cases the catalyst is introduced in vapor form separately into the reaction zone.

Example 10

The reaction vessel described in Example 1 is heated externally to 480° C. and into the upper opening of the tube there is led per hour a vaporous mixture of 66 grams of cyclopentadiene and 0.2 gram (about 0.3% by weight) of triethylamine. As the mixture is introduced into the tube it is preheated in countercurrent to about 460° C. by the vapors leaving the tube. In cocurrent to the flow of the cyclopentadiene containing catalyst through the reaction zone there is also introduced at the same time 270 liters of chlorine per hour into the reaction vessel. The vapors leaving at the lower end of the tube are cooled to about 25 to 30° C. As a condensate there are obtained per hour on an average about 248 to 253 grams. The liquid reaction product consists to the extent of about 90 to 91% of hexachlorcyclopentadiene; the remainder consists of components of higher boiling point which can readily be separated by distillation.

Example 11

Cyclopentadiene is vaporized and the vapor heated to 300° C. in a preheater. The vapor is then led into a pentadienes of a lower degree of chlorination and 3 to 4% of constituents of higher boiling point, mainly dimeric hexachlorcyclopentadiene.

Example 12

300 liters of chlorine, 40 liters of nitrogen and 66 grams of cyclopentadiene vapor which with 3% by weight of N.N-dimethylformamide have been mixed are led per hour into the top of a tube of ceramic material 2000 mm. long and 28 mm. in diameter which is arranged vertically and heated externally to 365° C. After cooling the vapors leaving the lower end of the tube to room temperature, there are obtained per hour 268 grams of a liquid reaction mixture. The mixture consists to the extent of about 92 to 94% by weight of hexachlorcyclopentadiene and about 8 to 6% by weight of products of higher boiling point of which the bulk is dimeric hexachlorcyclopentadiene.

By using the initial hydrocarbons and catalysts enumerated in the following table in the reaction with chlorine in the manner above described, the results given are obtained at the reaction temperatures specified:

| Example | hydrocarbon+percent by weight of catalyst | amount added g./l. | nitrogen l./h. | chlorine l./h. | reaction temperature °C. | liquefied reaction products g./h. | content of liquefied reaction product in: | | |
|---|---|---|---|---|---|---|---|---|---|
| | | | | | | | hexachlorcyclopentadiene in percent by weight | other chlorinated hydrocarbons in percent by weight | compounds of higher boiling point in percent by weight |
| 13 | pentane+2% of dibutylamine | 36 | 40 | 160 | 375 | 118-121 | 88-90 | 6-4 | 6-5 |
| 14 | pentane+2% of butylpyrrolidine | 36 | 40 | 160 | 375 | 117-120 | 87-90 | 6-3 | 6-5 |
| 15 | pentane+3% of N.N-dibutylformamide | 36 | 20 | 180 | 375 | 118-120 | 86-89 | 9-7 | 5-3 |
| 16 | pentane+4% N₂O | 36 | 20 | 180 | 375 | 119-124 | 90-94 | 5-2 | 5-3 |
| 17 | cyclopentadiene+1% of triethylamine | 66 | 80 | 240 | 360 | 268-271 | 92-94 | | 7-6 |
| 18 | dicyclopentadiene+2% of cyclohexylamine | 66 | 80 | 240 | 400 | 267-270 | 90-94 | | 9-5 |
| 19 | dicyclopentadiene+3% of N.N-dibutylformamide | 66 | 40 | 280 | 370 | 268-271 | 90-92 | | 9-7 |
| 20 | dicyclopentadiene+3% of N-methylformamide | 66 | 40 | 280 | 375 | 265-269 | 91-94 | | 8-5 |
| 21 | dicyclopentadiene+4% N₂O | 66 | 40 | 240 | 375 | 268-270 | 93-96 | | 6-4 |
| 22 | 2-methylbutane+3% NO | 36 | 40 | 160 | 375 | 116-119 | 84-87 | 11-8 | 5-3 |
| 23 | 2-methylbutane+2% of cyclohexylamine | 36 | 40 | 160 | 375 | 117-119 | 84-86 | 11-7 | 5-3 |

Example 24

A vertically arranged tube of ceramic material 28 mm. in diameter and 200 mm. in length is heated externally to 380° C. by an electrical resistance heating. Through this tube from the top there are led hourly 36 grams of normal pentane as vapor and diluted with 20 liters of nitrogen while at the same time 160 grams of chlorine and 1.8 grams of vaporous nitrosyl chloride per hour are supplied separately to the reaction tube. The vapors leaving the lower end of the tube are cooled to 20° C., whereby part thereof liquefies. On an average there are obtained per hour about 125 to 128 grams of liquid reaction product which consists to the extent of 90 to 93% by weight of hexachlorcyclopentadiene, 4 to 5% of chlorinated aliphatic hydrocarbons, mainly polychlorpentanes, and 5 to 6% of compounds of higher boiling point, partly dimeric hexachlorcyclopentadiene.

The chlorinated aliphatic hydrocarbons can be mixed in the reaction of fresh vaporous normal pentane.

The fraction which remains gaseous when the vaporous reaction mixture is cooled may be in part supplied to a fresh reaction.

Further examples are given in the following table:

chlorcyclopentadiene. Moreover it contains about 2 to 3% by weight of less highly chlorinated cyclopentadienes and 3 to 4% by weight of compounds of higher boiling point. By fractional distillation the small amount of less highly chlorinated cyclopentadienes can readily be separated as first runnings, while after the main fraction the compounds of higher boiling point remain in the body of the still as distillation residue at a bath temperature of about 120° C. and 10 mm. Hg.

The less highly chlorinated cyclopentadienes, after evaporation, can be mixed with vaporous dicyclopentadiene and again supplied to further reaction.

Further examples are collected in the following table. These examples are carried out by supplying to the top of the reaction vessel described in Example 31 per hour at the reaction temperature given in the table the mixture consisting of initial hydrocarbon and catalyst in the amounts given in the table, while simultaneously chlorine and possibly nitrogen are led into the top of the tube separately in the stated hourly amounts. The working up of the vaporous reaction mixture leaving the tube at the bottom takes place in the way described in Example 31. The condensed portion of the reaction mixture obtained

| Example | hydrocarbon+percent by weight of catalyst | amount added g./h. | nitrogen l./h. | chlorine l./h. | reaction temperature °C. | liquefied reaction products in g./h. | content of liquefied reaction product in: | | |
|---|---|---|---|---|---|---|---|---|---|
| | | | | | | | hexachlor-cyclo-pentadiene in percent by weight | chlorinated aliphatic hydro-carbons in percent by weight | compounds of higher boiling point in percent by weight |
| 25 | n-pentane+3% NO | 36 | 80 | 160 | 400 | 125-129 | 91-94 | 6-3 | 3-2 |
| 26 | n-pentane+5% NO₂ | 36 | 40 | 180 | 375 | 118-122 | 90-93 | 6-3 | 4-2 |
| 27 | n-pentane+3% NO₂Cl | 36 | 60 | 160 | 380 | 119-123 | 89-92 | 5-3 | 5-4 |
| 28 | dicyclopentadiene+3% NO | 66 | 100 | 240 | 350 | 268-272 | 95-97 | | 3-5 |
| 29 | dicyclopentadiene+3% NO₂Cl | 66 | 50 | 210 | 375 | 267-271 | 95-96 | | 4-5 |
| 30 | dicyclopentadiene+NOCl | 66 | 20 | 300 | 400 | 266-270 | 94-96 | | 4-6 |

Example 31

Through a vertically arranged tube of ceramic material of a diameter of 28 mm. and a length of 2000 mm. which is heated externally to 400° C. there are led from the top each hour the vapor of 66 grams of dicyclopentadiene which are diluted with 50 liters of nitrogen and have been preheated to 400° C. in a heated vaporizer. At the same time there are supplied to the tube each hour 240 liters of gaseous chlorine and through a further supply 2 grams of diethylamine in vapor form. The vapors leaving the lower end of the tube are cooled to 20° to 25° C., whereby on an average about 266 to 268 grams of liquid separate per hour. The liquid reaction product consists to the extent of 92 to 94% by weight of hexaper hour by cooling and the composition of the liquefied mixture are given in the table:

| Example | hydrocarbon+percent by weight of catalyst | amount added g./h. | nitrogen l./h. | chlorine l./h. | reaction temperature °C. | liquefied reaction products g./g. | content of liquefied reaction product in: | | |
|---|---|---|---|---|---|---|---|---|---|
| | | | | | | | hexachlor-cyclopen-tadiene in percent by weight | less highly chlorinated cyclopen-tadienes in percent by weight | substances of higher boiling point in percent by weight |
| 32 | dicyclopentadiene + propionitrile | 66 + 0.66 | 20 | 240 | 400 | 269-271 | 95-98 | | 2-4 |
| 33 | n-pentane + acetonitrile | 36 + 0.36 | | 180 | 360 | 120-123 | 88-90 | 5-7 | 4-5 |
| 34 | cyclopentane + nitrogen monoxide | 35 + 1.4 | | 200 | 405 | 128-132 | 92-93 | | 4-5 |
| 35 | cyclopentene + nitrogen monoxide | 34 + 1.4 | 40 | 180 | 375 | 121-124 | 90-93 | | 5-6 |
| 36 | mixture of 85% n-pentane, 12% 2-methylbutane, 3% other aliphatic hydrocarbons + triethylamine | 36 + 0.7 | 40 | 180 | 380 | 118-121 | 89-91 | | 6-7 |

Example 37

The vapors of 66 grams of cyclopentadiene and 2 grams of 2-ethylhexylamine-(1), which have been preheated in a preheater heated to 370° C., are led per hour downwardly through a vertically arranged tube of ceramic material 28 mm. in diameter and 2000 mm. in length which is heated externally to 375° C. At the same time there are supplied to the tube 275 liters per hour of gaseous chlorine. The vapors leaving the lower end of the tube are cooled to 25° to 30° C., whereby on an average 263 to 266 grams per hour of liquid separate. The liquid reaction product consists to the extent of 89 to 90% by weight of hexachlorcyclopentadiene. Moreover there are obtained about 3 to 5% by weight of cyclopentadienes of a lower degree of chlorination and 3 to 5% by weight of constituents of higher boiling point.

We claim:

1. A process for the continuous production of hexachlorcyclopentadiene by the reaction of an aliphatic hydrocarbon from the group consisting of normal pentane, isopentane, cyclopentane, cyclopentene, cyclopentadiene, and dicyclopentadiene and mixtures of the same, with chlorine in the presence of a catalyst at a temperature of about 300° C. to 500° C., wherein the vapor of the initial hydrocarbon is continuously brought together in a reaction zone heated to the reaction temperature with chlorine and, as catalyst, with the vapor of at least one nitrogenous compound from the group consisting of oxides of nitrogen, nitrogen oxychlorides, alkyl amines wherein the alkyl groups having 1-8 carbons, cycloalkyl amines having 5-6 carbons in the cyclic ring with 0-2 alkyl groups of 1-4 carbons substituted on the carbons of the cyclic ring and 0-2 N-alkyl groups of 1-4 carbons, anilines with 0-2 N-alkyl groups of 1-4 carbons, heterocyclic amines having 4-6 carbons and an amino nitrogen in the heterocyclic ring with 0-1 alkyl group of 1-4 carbons, benzonitrile, alkanyl and alkenyl nitriles with up to 8 carbons, formamides containing 0-2 N-alkyl groups of 1-4 carbons, pyrrolidone, and N-alkylpyrrolidone wherein the alkyl group contains 1-4 carbons so that the reaction components and the catalyst migrate simultaneously through the zone in homogeneous vapor phase, the reaction mixture leaving the zone in vapor phase is cooled and hexachlorcyclopentadiene is separated from the condensate.

2. A process according to claim 1 wherein the initial hydrocarbon and gaseous chlorine are used in the molar ratio 1:8 to 1:15.

3. A process according to claim 1 wherein the catalyst is used in an amount of 0.2 to about 10% by weight with reference to the amount of hydrocarbon to be reacted.

4. A process according to claim 1 wherein there is used as the initial hydrocarbon an alkane with 5 carbon atoms of which at least 4 carbon atoms are arranged in a straight chain.

5. A process as claimed in claim 1 wherein cyclopentadiene serves as the initial hydrocarbon.

6. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same with chlorine in the presence of a catalyst at a temperature of about 300° to 500° C., wherein the vapor of the initial hydrocarbon is brought together in a reaction zone heated to the reaction temperature with chlorine and at least one oxide of nitrogen as catalyst, the reaction mixture is withdrawn from the zone and cooled, and the hexachlorcyclopentadiene is separated from the liquid reaction product.

7. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to reaction temperature with chlorine and the vapor of a nitrogen oxychloride as catalyst, the reaction mixture is withdrawn from the zone and cooled and the hexachlorcyclopentadiene is separated from the liquid reaction product.

8. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to the reaction temperature with chlorine and the vapor of an alkyl amine wherein alkyl has 1-8 carbons as catalyst, the reaction mixture is withdrawn from the zone and cooled and the hexachlorcyclopentadiene is separated from the liquid reaction product.

9. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to the reaction temperature with chlorine and benzonitrile vapor as a catalyst, the reaction mixture is withdrawn from the zone and cooled and hexachlorcyclopentadiene is separated from the liquid reaction product.

10. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to the reaction temperature with chlorine and the vapor of at least one alkyl nitrile with 1 to 8 carbon atoms in the alkyl radical, the reaction mixture is withdrawn from the zone and cooled and the hexachlorcyclopentadiene is separated from the liquid reaction product.

11. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same, with chlorine in the presence of a catalyst at a temperature of about 300° to 500° C., wherein the vapor of the initial hydrocarbon is brought together with chlorine and the vapor of a formamide having 0-2 N-alkyl groups of 1-4 carbons as a catalyst in a reaction zone heated to reaction temperature, the reaction mixture is withdrawn from the reaction zone and cooled and the hexachlorcyclopentadiene is separated from the liquid reaction product.

12. A process for the production of hexachlorcyclopentadiene by reaction of an aliphatic hydrocarbon from the group consisting of normal pentane, isopentane, cyclopentane, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to the reaction temperature with chlorine and the vapor of pyrolidone as a catalyst, the reaction mixture is withdrawn from the zone and cooled and the hexachlorcyclopentadiene is separated from the liquid reaction product.

13. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to the reaction temperature with chlorine and the vapor of a cycloalkyl amine having 5-6 carbons in the cyclic ring with 0-2 alkyl groups of 1-4 carbons on the carbons of the cyclic ring and 0-2 N-alkyl groups of 1-4 carbons as catalyst, the reaction mixture is withdrawn from the zone and cooled and the hexachlorcyclopentadiene is separated from the liquid reaction product.

14. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to the reaction temperature with chlorine and the vapor of a heterocyclic amine with 4–6 carbons and an amino nitrogen in the heterocyclic ring with 0–1 alkyl group of 1–4 carbons as catalyst, the reaction mixture is withdrawn from the zone and cooled and the hexachlorcyclopentadiene is separated from the liquid reaction product.

15. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to the reaction temperature with chlorine and the vapor of acrylonitrile, the reaction mixture is withdrawn from the zone and cooled and the hexachlorcyclopentadiene is separated from the liquid reaction product.

16. A process for the production of hexachlorcyclopentadiene by reaction of an aliphatic hydrocarbon from the group consisting of normal pentane, isopentane, cyclopentane, cyclopentene, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to the reaction temperature with chlorine and the vapor of methacrylonitrile, the reaction mixture is withdrawn from the zone and cooled and the hexachlorcyclopentadiene is separated from the liquid reaction product.

17. A process for the production of hexachlorcyclopentadiene by reaction of an aliphatic hydrocarbon from the group consisting of normal pentane, isopentane, cyclopentane, cyclopentadiene, dicyclopentadiene and mixtures of the same, with chlorine in the presence of a catalyst at a temperature of about 300° to 500° C., wherein the vapor of the initial hydrocarbon is brought together in a reaction zone heated to the reaction temperature with chlorine and the vapor of N-alkyl pyrrolidone wherein the alkyl group has 1–4 carbons, as a catalyst, the reaction mixture is withdrawn from the zone and cooled and the hexachlorcyclopentadiene is separated from the liquid reaction product.

References Cited in the file of this patent

UNITED STATES PATENTS

| | | |
|---|---|---|
| 2,658,085 | Kleiman | Nov. 3, 1953 |
| 2,795,622 | Wetroff et al. | June 11, 1957 |

UNITED STATES PATENT OFFICE

CERTIFICATE OF CORRECTION

Patent No. 2,945,893                        July 19, 1960

Adolf Steinhofer et al.

It is hereby certified that error appears in the printed specification of the above numbered patent requiring correction and that the said Letters Patent should read as corrected below.

Columns 7 and 8, second table, seventh column thereof, in the heading, for "liquefied reaction products g./g." read -- liquefied reaction products g./h. --.

Signed and sealed this 10th day of January 1961.

(SEAL)
Attest:

KARL H. AXLINE
Attesting Officer

ROBERT C. WATSON
Commissioner of Patents